April 8, 1969  H. H. W. HENCH  3,436,792
APPARATUS FOR PRODUCING STRANDS OR GRANULES FROM LIQUID MATERIAL
Filed Nov. 22, 1966  Sheet 1 of 10

INVENTOR
HANS HEINRICH WILHELM HENCH
BY *Otto John Munz*
ATTORNEY

INVENTOR
HANS HEINRICH WILHELM HENCH

FIG. 12

INVENTOR
HANS HEINRICH WILHELM HENCH

April 8, 1969  H. H. W. HENCH  3,436,792
APPARATUS FOR PRODUCING STRANDS OR GRANULES FROM LIQUID MATERIAL
Filed Nov. 22, 1966  Sheet 8 of 10

FIG. 16

INVENTOR
HANS HEINRICH WILHELM HENCH

FIG. 17

INVENTOR
HANS HEINRICH WILHELM HENCH
BY Otto Johne Munez.
ATTORNEY 3,436,792
APPARATUS FOR PRODUCING STRANDS OR
GRANULES FROM LIQUID MATERIAL
Hans Heinrich Wilhelm Hench, 75 Aschaffstr.,
875 Aschaffenburg, Germany
Filed Nov. 22, 1966, Ser. No. 596,213
Claims priority, application Germany, Nov. 25, 1965,
H 57,776
Int. Cl. D01d 5/00
U.S. Cl. 18—8                 1 Claim

ABSTRACT OF THE DISCLOSURE

A process involving producing a strand of liquid material and passing a stream of heat transfer fluid around the strand. The heat transfer fluid and optionally another auxiliary fluid flow at a faster velocity than the strand and stretch it during its solidification. An apparatus to perform the process has a vessel for containing the liquid, a duct to drain the liquid therefrom in the form of a strand and nozzles surrounding the duct to feed heat transfer and other fluids around the strand.

BACKGROUND OF THE INVENTION

Field of the invention

The invention relates to a process and apparatus for the continuous or discontinuous discharge of inorganic or organic fluid materials, such as thermoplastic synthetic materials of a narrow melting range, plastics polymerizing on contact with a catalyst, and similar materials hereinafter discussed. The material exits in the shape of a strand for instance from polycondensation and polymerization devices, extruders and melt conveying pumps. The invention relates to stretching the discharged liquid to strands or fibers and to dividing the melt product into granulated material.

Description of the prior art

The processing of thermoplastic materials is known to meet with great difficulties if stand-shaped profiles are to be produced. The material to be processed must be fed to a molding device in a continuous or discontinuous manner, and the formed strand must be withdrawn simultaneously with the aid of rollers. Upon cooling of the liquid material, the resulting solidified material adheres sometimes to the mold; hence, the process is susceptible to disturbances.

The processing of thermoplastic synthetic materials in extruders or similar devices is predominantly conducted with a raw material in the form of granules. These granules are obtained directly from the melts produced in polymerization or polycondensation systems. These melts are withdrawn in the form of bands and are separated, after cooling, longitudinally and at right angles to the direction of the band, into approximately cube-shaped pieces. Another customary process involves crushing the solidified melt in hammer mills or the like into sharp-edged fragments. These processes are employed mainly because of their high production rate, but they are burdened by the disadvantage that the granulated material, because of its nonuniform or irregular shape, has a variable bulk density and a high dust content, whereby its behavior during further processing is, as experience has shown, very unfavorable.

In order to avoid these disadvantages, the melt was heretofore pressed through nozzles of a few millimeters in diameter, and the melt strands were allowed to enter a water bath and solidify therein. From this water bath, they were conducted to a cutting device where they were divided into pieces of equal length. When conducting this process, a very uniform granulated material is obtained whose diameter is only little smaller than that of the nozzles, but the disadvantage of this process is its low production rate. This low rate is particularly unfavorable when it is necessary to discharge the melt from modern polymerization vessels which have capacities of several tons. Discharging must be done within a short period of time, about 20–30 minutes, in order to substantially prevent depolymerization of the melt occurring as a function of time.

A particularly suitable shape of the granulated material is a cylindrical configuration in the case of synthetic materials. Ordinarily, the length of the cylinder is desired equal to its diameter, and each is to have the same size. Depending upon their future use, such cylinder granules are required to have various sizes, generally having a diameter of between 1 and 3 mm.

In case of inorganic substances, for example, slags, or building materials, the melt is allowed to run from a tap opening of the smelting furnace into a water bath, thereby producing granules of differing sizes. A conventional process comminutes such melts by liquid or gaseous media under pressure. These media are effective externally from all sides and lie in a conical surface. The freely discharging stream of melt is broken up into granules. Since the stream of freely discharging melt usually varies considerably with respect to its thickness and velocity, uniform granulated material is also not obtained in this process.

SUMMARY OF THE INVENTION

The object of the present invention is to withdraw, within a short period of time, relatively large quantities of liquid materials from a liquefying device and to produce therefrom endless strands or fibers of a uniform thickness. Granulated materials satisfying the above-mentioned requirements can then be obtained from the solidified strands. A further object of this invention is the direct production of granulated materials by dividing and solidifying the liquid immediately upon its withdrawal.

It has been discovered that strands or fibers of viscous liquids can be produced if the liquid exiting from a liquefying device is first hardened, without the exertion of lateral forces, until it is stiff on the outside, and is then subjected to the effect of a tractive force in the withdrawing direction, whereby the strand of liquid material, upon exiting from the liquefying device, is stretched as a function of this tractive force. The liquid material must then be additionally hardened until it is completely solidified then separated from the solidifying device, and finally passed on to further processing or use. By increasing the traction and, if desired, under the action of lateral forces, the exiting liquid strand is divided and solidified by a heat transfer medium. This forms directly a uniform granulated material of an approximately spherical shape. The traction upon the liquid strand and the cooling thereof is effected by the stream of liquid or gaseous heat transfer media which is conducted at a higher velocity than the strand in the strand flow direction.

Thus, the invention relates to a process for the discharging of liquids of all types, and for the production of strands, fibers, or granules therefrom. The invention resides mainly in passing liquid strands immediately or shortly after leaving a container into a stream of liquid and/or gaseous heat transfer media. This stream is guided at a higher velocity than the strand substantially in the direction of strand flow. The drag effect of the heat transfer fluid accelerates the strand. The liquid strand is, if desired, stretched or ganulated. In this connection, it is possible to control the velocity and/or amount of the heat transfer media. The liquid product is then withdrawn together with the heat transfer media and, after being separated from the latter, passed on to further working or further treatment. The further treatment can be conducted in known devices, for example, stretching devices or cutting devices for the production of granules.

The material which is suitable within the scope of the present invention has the properties of being liquefiable. Such is accomplished with thermoplastic materials by the step of heating. Various other materials become liquid by dissolving chemically in a suitable solvent. The material further must meet the requirement of being solidifiable either upon cooling, such as if it is a thermoplastic, e.g., a polyamide, or upon heating such as, for instance, a resin such as methylmetacrylate under influence of a catalyst. A wide range of materials meeting these specifications is well known to the art.

The thickness of the liquid strand and the desired degree of hardening the same is attained by regulating the velocity and/or the quantity of the substances serving as the heat transfer media.

According to the invention, the velocity of the stream of heat transfer fluid is gradually increased from the point where it contacts the liquid strand, until the velocity is such that it corresponds to the desired stretching of the strand. Owing to this stretching process, the velocity of the strand exiting from a liquid device continuously increases until its external hardening. The velocity of the heat transfer medium stream must be regulated to the stretching process lest the withdrawal of the strand be impaired due to the increase of its viscosity.

When producing equal-length products, the flow rate of the material, as well as the flow rate of the cooling medium are measured according to the invention and transmitted by pulses from electrical transducers to the cutting devices to adjust the cutting speed thereof. Analogously, stretching devices or other apparent for further processing of the product can also be controlled in this manner.

The liquid product is withdrawn, in accordance with the invention, by means of the heat transfer medium. This medium encompasses the liquid material and guides it up to, or almost up to, the cutting device or further processing device. Then, the heat transfer medium is conducted away from the strand. Thus, the exiting direction of these strands or fibers is not influenced by the heat transfer medium.

In case of inorganic melts, such as building materials, slags, or the like, having a high melting temperature, as well as in case of organic melts of a wider melting range, the invention provides for proceeding in such a manner that the liquid is rapidly divided and quenched by heat transfer media introduced obliquely to the withdrawal direction. In this case, the product is discharged in the form of granules together with the stream of heat transfer medium.

In order to control the particle size of granulated material or the degree of stretching of liquid strands exiting from a liquefying device, as well as in order to adjust the amount of heat transfer media to the amount of liquid to be discharged, the velocity and/or the amount of the stream of heat transfer fluid is variable. This is accomplished, in accordance with the invention, by varying the annular cross-section of the heat transfer fluid feed nozzle.

Suitable heat transfer media are liquid and/or gaseous substances, such as, for example, water, air, steam, or inert gases which, if desired, are recovered in a conventional manner, cooled or heated and, after being subjected to a filtering step, used again.

Generally, organic and, in many cases, also inorganic liquids have a low heat conductivity. The long heat transfer and hardening period ensuing therefrom increases as the square of the thickness of the strands to be produced or the particle size of the granules. In the case of such conditions, in order to avoid rupturing of the liquid strand and to obtain a uniform thickness, the tractive force exerted upon the strand by the heat transfer media is to become effective only after a superficial hardening of the liquid product is obtained. Therefore, it is necessary to provide a preliminary cooling zone whose length depends upon the thickness of the strands. This is attained in accordance with the invention by first conducting the liquid from the liquid device into a heat trnasfer medium stream directed substantially parallel to the discharge direction of the liquid, this stream being maintained by the effect of a suction medium which can simultaneously serve as additional heat transfer medium.

In accordance with the invention, in special cases, it can also be advantageous to spray the strand exiting from a liquid-holding vessel with a heat transfer medium before the strand enters the heat transfer medium stream moving substantially in parallel to the discharge direction, or the spraying can be done while the strand is in the parallel flow.

The process of this invention is particularly distinguished by the fact that liquid can be withdrawn from relatively large openings of the liquid-holding device, and can be extensively stretched. Production rate is extraordinarily high. This rate can be additionally multiplied by conducting, according to the invention, a plurality of strands into the heat transfer medium stream. By proceeding in this manner, the further advantage is obtained that each individual hardened strand, or each fiber, has the same thickness, since the drag effect of the combined heat transfer and suction medium stream upon each strand or each fiber is identical, and thus the extent of stretching is likewise identical. A further advantage residing in this invention is that the strands or fibers can be twisted to a rope or a thread. This is accomplished by introducing into the heat transfer and suction medium stream tangentially thereto a liquid or gaseous medium having a velocity curl corresponding to the desired twist of the strands or fibers.

According to the invention, the liquid product, after being hardened in the heat transfer and suction medium stream, is separated therefrom and passed on to a conveying device from where it is mechanically, pneumatically, or hydraulically conducted to further processing.

The traction required for stretching the melt product can also be effected mechanically, this traction being exerted upon an already hardened strand section by a conventional draw-off device. The stream of heat transfer medium is then maintained by the effect of gravity rather than by the suction medium. This process can be employed for the production of fibers or very thin strands whose hardening process is completed along a short heat transfer path. In case of thicker and thus more rigid strands, a longer heat transfer zone is required. They are set into elastic oscillations which continue up to the vicinity of the outside orifice of the liquid-holding vessel where the melt product is still viscous. This yields wrinkled strands of a non-uniform thickness. Also, when the length of the strand is increased, rupturing can occur.

The exit velocity of liquid from a liquefying device is determined by viscosity, the latter being dependent upon temperature. In order to maintain the temperature or the viscosity constant, the liquid is cooled or heated, according to the invention, in the exit zone of the device.

The apparatus for conducting the process of this invention consists essentially of an annular nozzle for the introduction of the heat transfer media. This nozzle is provided directly at the outside orifice of the liquid-holding vessel. This is the narrowest cross-section of the discharge duct. The vector resultant direction of the cooling media extends along the direction of flow of the strand coming from the outside orifice. The heat transfer medium stream exiting at a high velocity accelerates the discharge of the liquid strand by its drag effect. Depending upon the velocity of the heat transfer stream, it stretches or tears the molten strands, while continually withdrawing and cooling it.

In order to control the amount and/or velocity of the stream of heat transfer medium exiting from the annular nozzle, a nozzle ring is provided which is adjustable in its axial direction, whereby the flow gap of the annular nozzle is varied. The adjustment can be accomplished by a mechanical device of any desired construction. However, in a special embodiment of the invention, the adjustment is provided by means of a spring which presses the axially displaceable nozzle ring into its terminal position and is so dimensioned with respect to its elastic force that this force can be overcome to a certain degree by increasing the pressure of the heat transfer medium, whereby the annular nozzle is opened to a greater or lesser extent, depending upon the pressure of the heat transfer medium and the amount of suction from the suction medium. By constructing the adjustable nozzle ring in another embodiment of the invention as a ring piston upon which piston the adjustable pressure of the liquid or gaseous medium of a fluid-pressure system is effective, the velocity and amount of the heat transfer medium are regulated independently.

In order to increase the production rate, several nozzles can be provided for discharging the liquid from the liquid vessel furnace. These nozzles are provided in a row side-by-side, behind one another, on a circular line, a spiral line, or similarly extending lines.

For withdrawing liquids requiring a longer preliminary heat transfer path, a nozzle for feeding the heat transfer media is provided which extends below the outside orifice of the liquefying device and coaxially surrounds the discharging strand of liquid material. In this nozzle, baffles are provided in order to guide the stream of heat transfer medium in parallel to the discharge direction of the liquid. For introducing the suction medium, an annular nozzle encompasses the heat transfer medium nozzle at its end and has an effective direction extending in the discharge flow direction of the liquid, in parallel or almost parallel thereto, this direction being ensured by baffles. A heat transfer channel joins the annular suction nozzle, through which channel the liquid product, the heat transfer medium, and the suction medium are withdrawn together.

The arrangement of the baffles in the nozzle for the heat transfer medium, as well as in the suction nozzle, is of considerable importance, because, particularly in case of the former, by the suction effect of the latter, the heat transfer medium is pulled in the manner of a vortex when the baffles are missing. The twist of the heat transfer medium would then also twist the liquid product.

According to the invention, the nozzle for the heat transfer medium is of conical shape narrowing in the discharge direction, whereby the heat transfer medium flows along the liquid product at a gradually increasing velocity. The length of the nozzle is dependent upon the thickness of the melt product and its heat conductivity.

An additional adjustable preliminary heat transfer for the liquid product is provided, in accordance with the invention, by arranging, in the wall of the nozzle for the heat transfer medium, at a right or acute angle to the discharge flow direction of the liquid, radially extending nozzles or annular slots, distributed evenly along the circumference, for the introduction of a heat transfer medium, or by arranging spray nozzles for a heat transfer medium above the heat transfer medium nozzle.

Preliminary cooling or preliminary hardening of the liquid product can also be conducted in two or several stages. The discharge rate is increased by a multiple if the liquid device is provided with a corresponding plurality of liquid discharge ducts. According to the invention, there are provided, for example, below a number of liquid discharge outside orifices the same number of heat transfer medium nozzles, these nozzles terminating in a further heat transfer medium nozzle through which the entire number of liquid strands and all of the heat transfer media are withdrawn. In accordance with the invention, it is also possible to provide beneath several liquid discharge orifices one heat transfer medium nozzle common to all liquid strands. The selection of a particular embodiment depends essentially upon the thickness of the liquid strands, and upon the heat conductivity of the liquid product. In this connection, it is important to prevent the individual liquid strands from contacting one another until they have hardened externally so that there is no danger that they stick together.

The heat transfer effect of liquid media, which is substantially more intensive as compared to gaseous media, is often undesirable, particularly for thin liquid strands and those strands which are to be stretched extensively. In such cases, gaseous cooling media are utilized. These cool more gently over a longer path and the viscosity of the strands is not suddenly increased. After stretching such strands, however, a rapid heat transfer is advantageous in order to shorten the remaining path. Therefore, according to the invention, a nozzle is employed which has a dual function: Firstly, it is to feed a gaseous heat transfer medium whose stream surrounds the liquid strand, and secondly, it is to supply a liquid medium moving along the nozzle wall in a more or less thick sheet. The extensive stretching and preliminary hardening of the strand is thus conducted in a gaseous stream which is then combined with a liquid stream of heat transfer medium so that the complete solidification of the liquid product takes place in a short path under the auxiliary effect of the liquid medium. This can be further enhanced by a liquid suction medium. The guidance of a layer of liquid medium along the nozzle wall has the additional advantage that, at the start of the discharge operation, the liquid strand exiting from the liquid device, at first loosely hanging down, cannot contact the dry nozzle wall and adhere thereto, but is dragged by the liquid heat transfer medium and introduced into the suction nozzle mouth. It was discovered that the liquid product does not adhere to a wall which has liquid running thereon.

The nozzle for the suction medium is provided advantageously directly after the heat transfer medium nozzle, since this provides for the most advantageous conditions for stretching the liquid product. The suction media entering through its annular nozzle centers the liquid strand in the heat transfer medium nozzle and in the heat transfer channel and ensures a smooth and steady withdrawal from the liquid vessel.

If it is necessary, for process technical reasons, to provide a long preliminary heat transfer path, for example, in order to harden the liquid product by heat transfer media only slightly different in temperature from that of the liquid strand, the nozzle for the suction medium can, of course, be arranged further downstream, or at the end of the heat transfer channel. A partial section of the heat transfer channel then adjoins the heat transfer medium nozzle, for example, before the suction media are introduced; these suction media can have a highly different temperature for increasing the heat transfer effect upon the liquid product at the end of this process step.

The suction medium nozzle is not limited to the configuration of an annular nozzle. Although the annular shape is preferred for the reasons set out above, it can, for example, be quite suitable, for constructional reasons, to employ a different nozzle shape.

The above-mentioned embodiments of the device for the withdrawal of liquid are by no means exhaustive, but are only examples of the inventive embodiments. The selection of a particular embodiment is dependent upon the properties of the liquid product and the heat transfer media.

The device for conducting the process of this invention furthermore includes means to separate the hardened liquid product from the heat transfer and suction media. According to the invention, this is accomplished by an apparatus at the end of the heat transfer passage for the liquid product and the discharge thereof. The means are distributed evenly along the circumference of the passage or arranged continuously, being one or several slots extending at right angles or obliquely to the direction of flow or obliquely thereto, through which slots only the heat transfer and suction media can be withdrawn.

After being separated from the heat transfer and suction media, the liquid product is passed on directly to further processing, or it is conducted to a conveying device which passes it on to further processing or use. For conveying the product, any suitable device of conventional construction can be employed. Particularly advantageous for conveying the melt product is, according to the invention, a device consisting of an inlet nozzle for the liquid product and an annular nozzle encompassing the inlet nozzle at its end for the introduction of a preferably gaseous conveying media, the passage for passing the liquid product on to further processing joining this nozzle system. The advantages of this device are the automatic adjustment of the conveying operation to the production of the withdrawal device, and the fact that the melt product is substantially freed from any adhering liquid cooling and/or suction media during this conveying step.

The starting material for the working of particularly extrudable synthetic materials is predominantly granulated material. The discharge of liquids within a short period of time, which is necessary in order to maintain high quality of the raw synthetic materials, also requires a high efficiency of the granulating apparatus. On account of the large degree of stretching of the liquid product and the enlarged outside orifice of the liquid device, the velocity at which the strand is fed to the cutting device becomes extraordinarily high. This velocity is about 6 to 12 m./sec. Since, at the same time, a plurality of strands, for example 40, are withdrawn and must be supplied to the cutting device in a uniform distribution, special structural measures must be taken. Either each strand is withdrawn by itself and fed in a channel up to the cutting device, the exits of the individual channels being distributed uniformly along the cutting device, or the strands, combined to a bundle in the withdrawing device, are fed together to the cutting device where they must be distributed along its circumference. In accordance with the invention, this distributing can be accomplished by providing an an annular inlet nozzle for the feeding of several strands from their withdrawing and heat transfer device. This inlet nozzle consists of a nozzle casing and a central core extending to a point facing the feeding direction. The core is rotatable about its axis and is also mounted to be axially displaceable. The core is connected with an oscillator of conventional construction, operating electromagnetically for example, and is set into rapid rotating and axial oscillation thereby. Furthermore, there is an annular nozzle provided for the introduction of a preferably gaseous conveying medium, for example, compressed air, an annular channel following this nozzle, delimited by the channel housing and the core, this annular channel being subdivided by guide ribs into individual channels for the single strands. The individual channels terminate in guide sections in a ventilating housing to which is joined a cutting device of conventional construction whose knife head cuts the strands fed thereto into pieces of equal length. The oscillator is operated only when initiating the operation of the withdrawing device, in order to distribute the strands shooting forward at a high speed along the circumference of the annular channel and to introduce them into the individual channels. Thereafter, the oscillator can be turned off, since then the conveying means alone takes care of the continuous transport of the strands to the cutting device. Analogously, the bundle of strands can be distributed into channels in the manner of a fan, and fed to a cutter block.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

BRIEF DESCRIPTION OF THE DRAWINGS

FIGRUE 10 is a longitudinal sectional view of another embodiment of the invention.

DESCRIPTION OF THE PREFERRED EMBODIMENT

Figure 1:
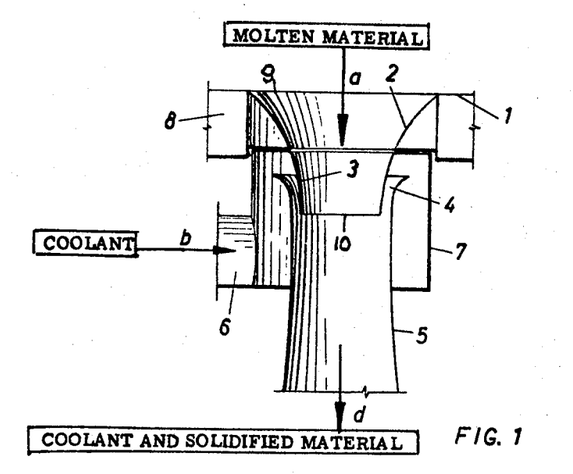
FIGURE 1 shows an apparatus of the invention in a longitudinal section.

Referring now in detail to FIGURE 1, in the bottom 1 of a melting vessel, a discharge duct 2 is provided for the withdrawal of a melt. This duct is limited by a wall 3 extending in the shape of a nozzle between an inside orifice 9 at the bottom 1 to an outside orifice 10. The outside orifice is encompassed by an annular heat transfer nozzle 4. The latter terminates in the channel 5 through which melt and cooling media entering through the heat transfer nozzle are discharged in the direction of arrow $d$. The feeding of the cooling media to the heat transfer nozzle is accomplished through feed pipes 6 in the direction of arrow b via the housing 7 surrounding the heat transfer nozzle. The bottom 1 of the melting device is normally cooled when using high melting temperature substances, particularly those of inorganic origin. It is heated or cooled in case of organic substances, particularly those having a narrow melting range (for example, polyamides), in order to be able to maintain the temperature, and thus the viscosity, of the melt constant.

Therefore, heating or cooling channels 8 are provided in the bottom. Liquid or gaseous heat transfer media are conducted through these channels. For organic substances, electrical heating devices can also be provided.

The illustrated apparatus is suitable for the production of granules or fibers from, for example, slag, glass, or minerals. The cooling and suction, medium exiting from the annular heat transfer nozzle surrounds the free, moisten strand and withdraws the melt from its physically bounded condition in the discharge duct, under a strong suction drag effect, in an accelerated manner, and, depending upon its impingement direction and velocity, immediately separates the melt strand into melt drops of a larger or smaller size. When producing granules, a vigorously effective cooling medium is preferably employed, for example, water which rapidly cools and solidifies the formed drops of melt. In contradistinction thereto, in the production of fibers, a gaseous cooling medium is preferably utilized, for example air, which exits under pressure and at a high velocity from the annular heat transfer nozzle and additional expands in the discharge channel, whereby the issuing melt is extended to fibers under gentle cooling. In this connection, it is advantageous to conduct the stream of cooling medium from the heat transfer nozzle in parallel, or almost in parallel, to the exit direction of the melt.

In addition to the temperature and viscosity of the melt, the particle size of the granulated material, or the thickness of the fibers, as well as the uniformity and quality thereof, depend to a substantial extent upon the amount and velocity of the cooling media flowing out of the nozzle. Both the amount and the velocity must be adjustable in correspondence to the quantity and temperature of the melt, as well as to the melt product to be produced. In case of a nozzle having a non-variable exit cross section, the amount of the cooling and suction media can be controlled by varying the pressure. However, the exit velocity of these media varies as a function of this amount and thus the influence upon the discharge process is, of course, very much limited.

Figure 2A:
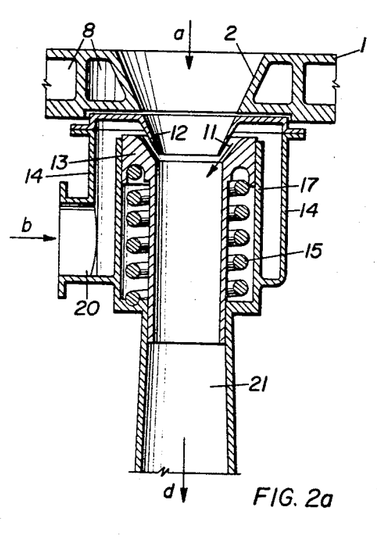
FIGURE 2a is a longitudinal sectional view of another embodiment of the invention.

In order to be able to regulate the speed and quantity of the cooling media exiting from the nozzle independently of each other, FIGURE 2a shows a nozzle 11 employed. It has a variable outlet cross section. The opening of this nozzle is formed by a fixed nozzle ring 12 and an axially movable nozzle ring 13 in the housing 14. The movable nozzle ring can be displaced, for example, by mechanical means. Thus it is shown that the movable nozzle ring 13 is adjusted by a spring 15. This spring presses the nozzle ring into its terminal position and closes the nozzle slot 11. It is also possible to provide a stop preventing the complete closing of this slot so that, at a low pressure, there can still exit an amount of cooling medium sufficient for cooling the device. The cooling medium exerts a pressure upon the movable nozzle ring, which pressure overcomes the force of the spring and opens the ring nozzle. Thus, when using a spring with a small spring constant, the amount of the cooling media can be varied, with the exit velocity remaining almost the same. It can be adapted to the amount and temperature of the withdrawn melt.

Figure 2B:
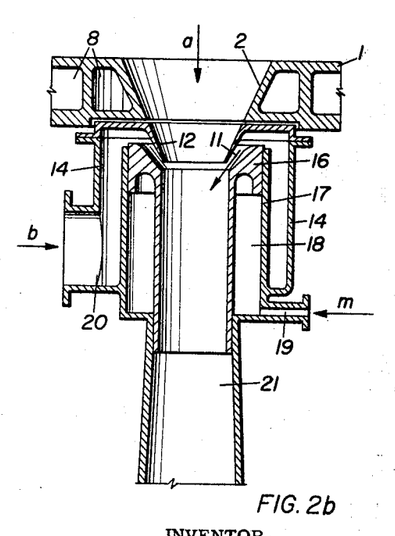
FIGURE 2b is a longitudinal sectional view of another embodiment of the invention.

FIGURE 2b is a modified version of FIGURE 2a. The movable nozzle ring 13 of FIGURE 2a is constructed in FIGURE 2b as a ring piston 16 which can be hydraulically or pneumatically displaced in the cylindrical guide section 17 of the housing 14. Through feed pipes 19, liquid or gaseuos media (for example, oil or air) are fed under pressure to the annular space 18 (in the direction of arrow m). By varying this pressure and the pressure of the heat transfer, suction media, their exit speed can be controlled. At a uniform pressure, the amount can be varied by feeding the cooling media in corresponding amounts through feed pipes 20 (direction of arrow b). By means of this device, it is thus possible, in a simple manner, to adjust the respectively required cooling and suction effect of the media, as well as the stretching or tearing of the melt. An automatic control can be effected by regulating, for example, the amount of cooling media by the temperature of the mixture of melt product and cooling media discharged through channel 21 in the direction of arrow d. A temperature sensing device is used in conjunction with a conventional control device.

The effective direction of the annular nozzle 11 illustrated in FIGURE 2 extends at an acute angle to the discharge direction of the melt. Thus, a sharp jet stream from the nozzle separates the withdrawn melt into the fine droplets which quickly solidify owing to the cooling medium and are discharged as granules.

Figure 3:
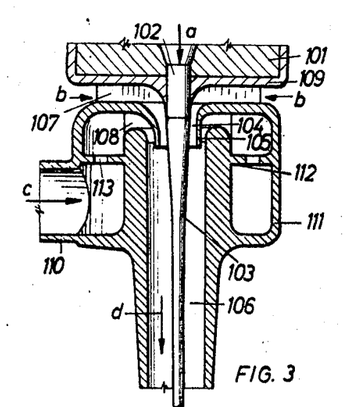
FIGURE 3 is a longitudinal sectional view of another embodiment of the invention.

The discharge apparatus of FIGURE 3 is provided immediately below the melting device bottom 101 with the discharge duct 102 for the melt 103. The apparatus comprises a heat transfer nozzle 104 for feeding the cooling medium in the direction of arrow b, the melt enters the center of the stream of cooling medium in the direction of arrow a. The discharge apparatus furthermore comprises an annular suction nozzle 105 for a suction medium. The channel 106 for the combined withdrawal of melt product, cooling media, and suction media in the direction of arrow d follows this nozzle 105. In the heat transfer medium nozzle 104, as well as in the suction nozzle 105 for the suction medium, there are provided baffles 107 and 108 extending radially to the axes thereof; these baffles ensure a curl-free feeding of these media. The wall 109 of the heat transfer nozzle, made of a heat-insulating material, prevents the removal of heat from the melting device. The suction medium (direction of arrow c) is fed to the nozzle housing 111 through feed pipe 110. The inner space of this housing is divided by the wall 112 wherein there are provided throttle openings 113 in a uniform distribution, these openings preventing a one-sided load upon the suction medium nozzle.

Figure 4:
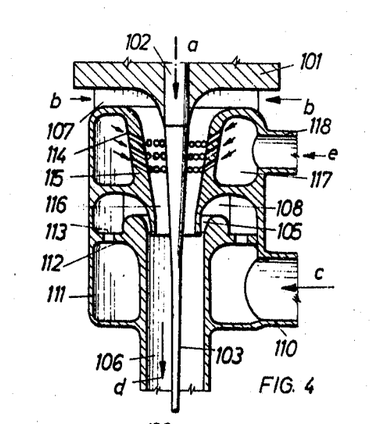
FIGURE 4 is a longitudinal sectional view of another embodiment of the invention.

Preliminary cooling of the melt product can additionally be conducted by the spray nozzles 114 of FIGURE 4 which are positioned in the wall 115 of the cooling medium nozzle 116 and through which an additional cooling medium is introduced. The effective direction of these spray nozzles is radially toward the melt product and at an acute angle to the discharge direction. The nozzle housing 111 is provided with an annular chamber 117, the additional cooling medium being fed to this chamber in the direction of arrow e through feed pipe 118 and from there to the spray nozzles.

Figure 5:
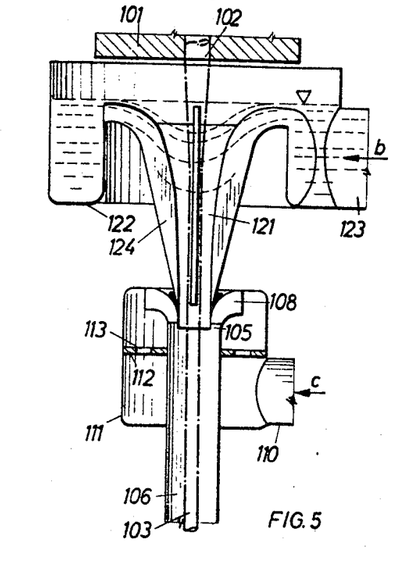
FIGURE 5 is a longitudinal sectional view of another embodiment of the invention.

In FIGURE 5, the heat transfer nozzle 121 is of an elongated conical shape, so that a longer preliminary cooling zone is created and the cooling medium is withdrawn therein with a gradually increasing velocity. This heat transfer nozzle 121 is in communication with a trough 122 to which is constantly fed cooling medium through a feed pipe 123. A constant level of cooling medium is maintained in this trough. In order to prevent the cooling medium from entering the nozzle with a curl, in the manner of a vortex, baffles 124 are provided radially toward the axis of the nozzle.

Figure 6:
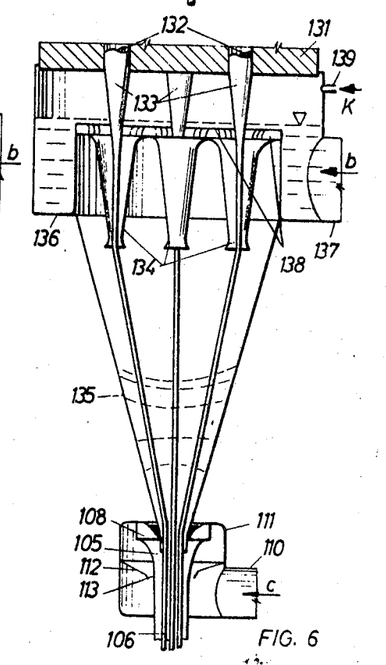
FIGURE 6 is a longitudinal section of another embodiment of the invention.

In the device for withdrawing several melt strands as shown in FIGURE 6, a heat transfer nozzle 134 is provided for each strand 133 exiting from the outlet openings 132 of the melting device 131. These heat transfer nozzles all terminate in an outer cooling nozzle 135 into which the strands and cooling media are drawn by the suction effect of the annular suction nozzle 105 and are discharged together with the suction media through the cooling channel 106. The nozzles 134 are supplied with liquid cooling media from the trough 136, the level of the media in the trough being kept at a constant value by corresponding replenishment in the direction of arrow $b$ through feed pipes 137. By the provision of baffles 138, a curl-free entrance of the heat transfer medium into the nozzle 134 is attained. If the melt is discolored or deteriorates in quality on account of the impingement of atmospheric oxygen which attacks the material, the space between the melting device and the cooling liquid can be filled with an inert gas, for example nitrogen, which is introduced through feed pipes 139 in the direction of arrow $k$.

Figure 7:
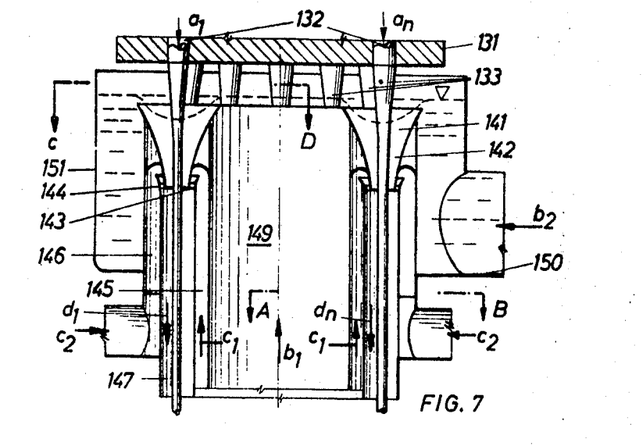
FIGURE 7 is a longitudinal sectional view of another embodiment of the invention.
Figure 8:
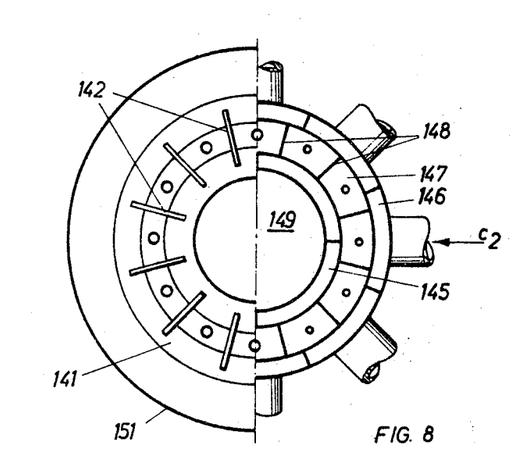
FIGURE 8 is a cross-sectional view, the right half along section line A–B, and the left half along section line C–D of FIGURE 7.

In the device for withdrawing several melt strands 133 according to FIGURES 7 and 8, an annular heat transfer nozzle 141 is provided. It is subdivided by walls 142 into individual nozzle sections between which the individual strands are withdrawn. The nozzle for the suction medium consists of two annular nozzles 143 and 144, an internal and an external one, which are supplied with suction media in the direction of arrows $c_1$ and $c_2$, through channels 145 and 146. The annular channel 147 is subdivided by walls 148 which are in alignment with the walls 142, so that each strand by itself is conducted to further processing, for example, to a cutting device and distributed along the circumference thereof. The cooling media are fed to the nozzle 141 through channel 149 (direction of arrow $b_1$) and through feed pipes 150 (direction of arrow $b_2$) via the trough 151. The levels of cooling media in 149 and 151 are maintained constant and at equal heights.

Figure 9:
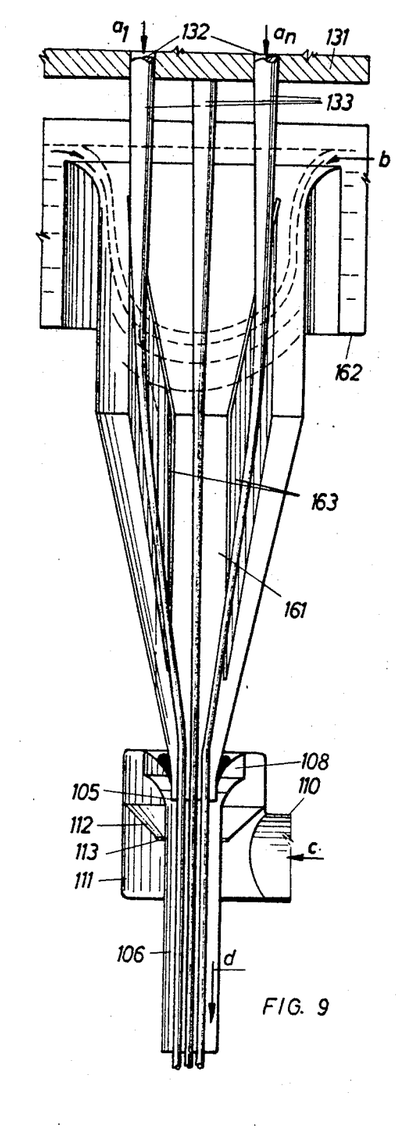
FIGURE 9 is a longitudinal sectional view of another embodiment of the invention.

The preliminary cooling of several melt strands can also be conducted in the heat transfer nozzle 161 of FIGURE 9. The melt strands 133 exiting from the melting device 131 through openings 132 in the direction of arrows $a_1 \ldots a_n$ are drawn into the nozzle 161. The cooling medium in the vessel 162 which is only superficially indicated in the drawing, and whose level is maintained constant, flows into the nozzle 161 and is conducted by walls 163 extending radially toward the axis of the nozzle substantially in parallel to the withdrawal direction of the melt strands. By means of the suction media exiting at a high velocity from the annular nozzle 105, the strands and the cooling media are withdrawn and discharged through channel 106.

Figure 10:
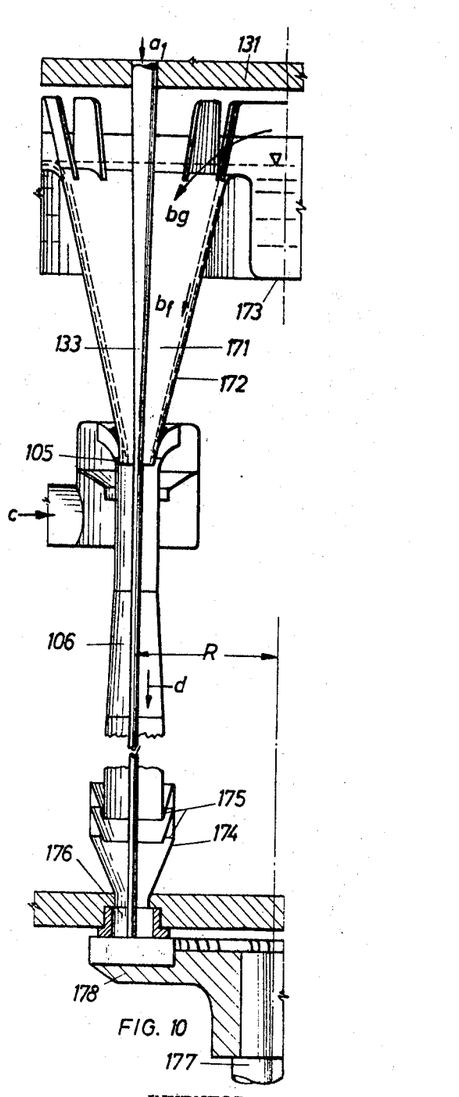

The discharge apparatus illustrated in FIGURE 10 comprises a heat transfer nozzle 171 into which a gaseous cooling medium is introduced in the direction of arrow $b_g$ and withdrawn with the melt strand 133. A liquid cooling medium (direction of arrow $b_f$) which is fed to the nozzle 171 from the trough 173, flows in a thin layer along the wall 172 of the nozzle and combines with the gaseous stream of cooling medium in about the proximity of the nozzle mouth, wherefrom both media are withdrawn together with the melt strand and accelerated by the stream of suction from the annular nozzle 105 through the channel 106, the melt strand being additionally cooled during this process. A device for separating the cooling and suction media from the cooled melt strand sits at the end of the channel 106. This device comprises a housing 174 with annular slots 175 extending at an acute angle to the discharge direction. The cooling and suction media are withdrawn through these slots, while the strand maintains its direction of travel and enters the opening 176 of a cutting device; the cutting head 178 of this cutting device, rotating about the shaft 177, divides the strand into pieces. Advantageously, a rather large number of withdrawing devices of the above-described type are provided in a circular arrangement, of any desired radius R, the center of such a circle being coincident with the extension of the axis of the cutter head.

The cooling and suction media are reused after they have been separated. The cycle thereof, shown in FIGURE 11, starts with a collecting and separating vessel 181 into which the cooling and suction media enter from channel 106 through slot 182, and wherein the gaseous media are separated from the liquid media. The liquid media pass through channel 183 to a pump 184; this pump conveys them via conduit 185 to a cooler 186 wherein they give off the heat absorbed from the melt to a cooling liquid. From the cooler, the liquid media are conducted via conduit 187 to a leveling vessel 188 which supplies a withdrawal device not shown in the drawing. The separated gaseous media are withdrawn from the vessel 181 through feed pipe 190 and used again after compression. If air is involved, it is conducted to the outside. The melt strand 133 enters the opening 176 of a cutting device and is divided into pieces by the cutter head 178 driven by motor 191. The granulated material obtained thereby falls into the container 192. In this container, a small amount of liquid is likewise collected which flows off together with the strand through the narrow opening 193. By way of conduits 194, the pump 195 removes this liquid by suction and conveys it via conduit 196, filter 197, and conduit 198 into the leveling vessel. The filter 197 cleans the liquid from any minute abrasion particles produced during cutting of the strand. Here, again, a plurality of withdrawing devices can be arranged on a circle having the radius R.

Figure 12:
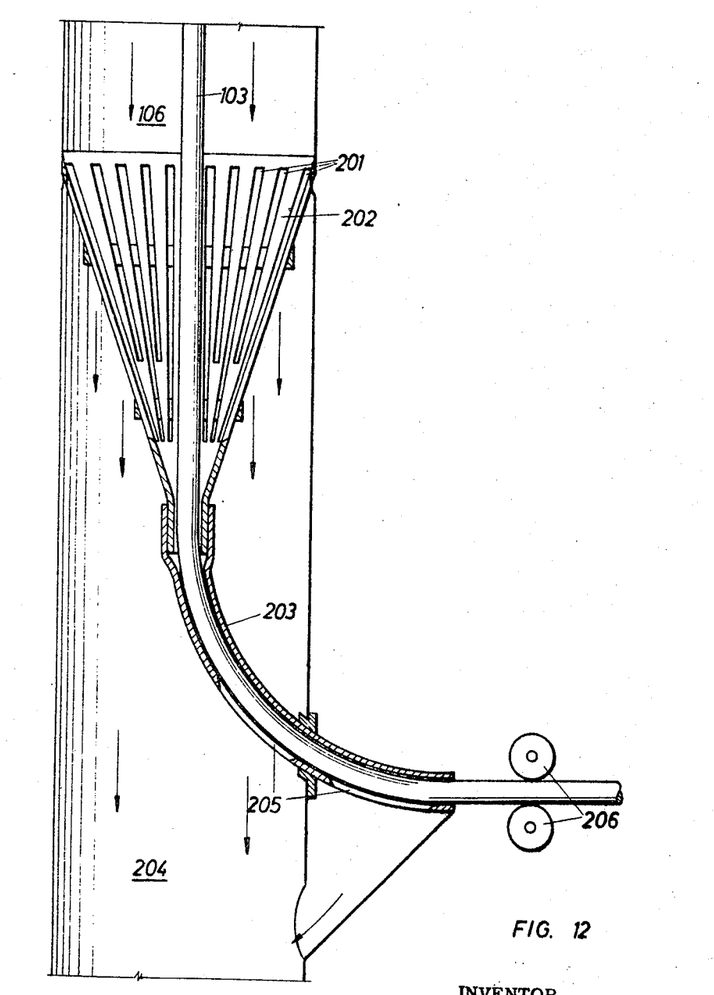
FIGURE 12 is a longitudinal sectional view of a device of the invention for separating the cooling and suction media from a strand.

The separation of the cooling and suction media from the melt strand 103 at the end of the channel 106 can also be accomplished as shown in FIGURE 12 by a funnel 202 provided with slots 201. A tube 203 for carrying the strand away is joined thereto. The slots are narrower than the thickness of the strand so that only the cooling and suction media pass therethrough. They are discharged through channel 204. Liquid medium discharged together with the strand through the tube 203 can flow back to the channel 204 through slots 205 in the tube 203. The strand exiting from the tube can be passed on to further processing by means of rollers 206, for example.

Figure 11:
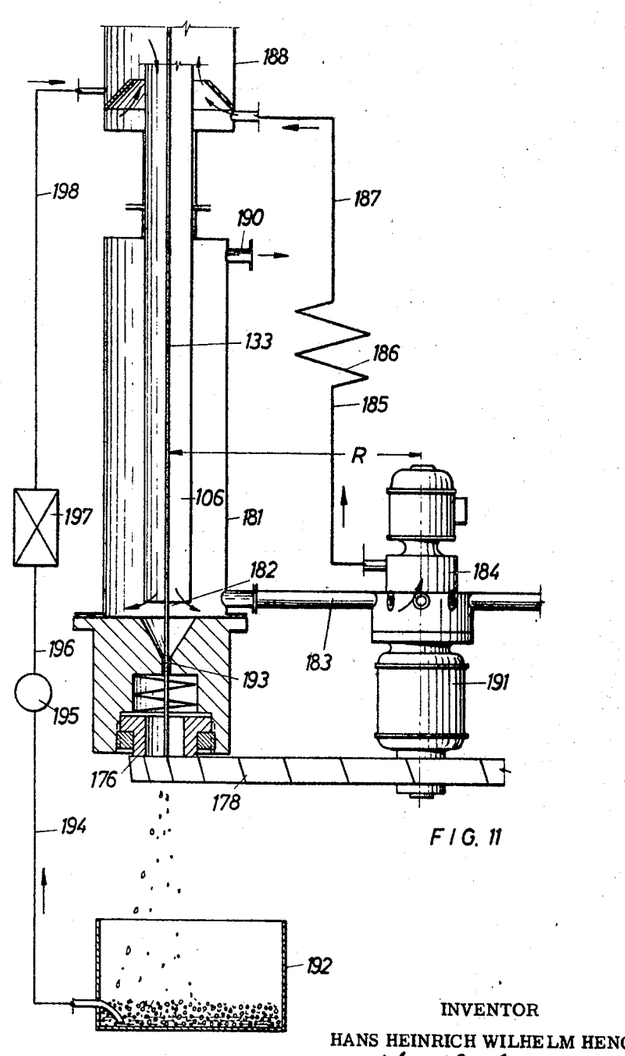
FIGURE 11 is a longitudinal sectional view of a heat transfer channel, a heat transfer and suction media separating device and a conveying device, all of the invention, as well as a device of the invention for maintaining a cooling medium cycle.

FIGURES 10 and 11 illustrate discharge and granulating devices wherein the melt strands are fed, in vertical channels, directly to a cutting device. For spatial reasons, it is not always possible to provide the necessary long cooling path in this vertical arrangement. Then, it is unavoidable to modify the device so that an oblique or horizontal position of the cooling channel is provided.

Figure 13:
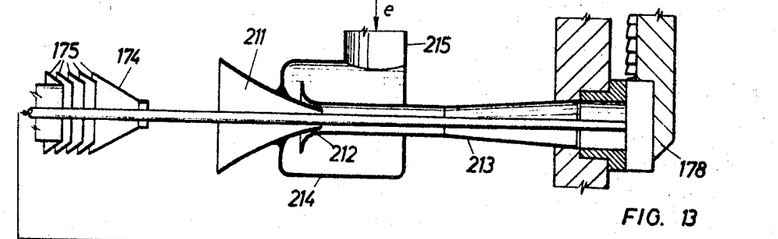
FIGURE 13 is a longitudinal sectional view of the end of a heat transfer channel, a conveying device and a guide passage for the melt strand to the cutting device, all of the invention.

In FIGURE 13, a cooling channel 106 is illustrated which is continued, after the withdrawing apparatus, which is not shown in the figure, in an arc in the horizontal plane until the required length has been attained. At the end of this channel, there is a device for separating the cooling and suction media, consisting of a housing 174 with slots 175 (see also FIGURE 10). For passing the strand along, an inlet nozzle 211 is provided through which the strand and the air are drawn in by means of an air jet from the annular nozzle 212 and passed on through conduit 213. In the drawing, the conduit terminates in a cutting device whose cutter head 178 divides the strand. Compressed air is fed to the housing 214 of the annular nozzle (direction of arrow $e$) through the feed pipe 215.

Figure 14:
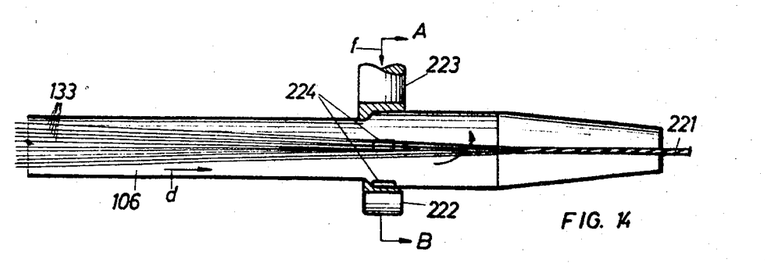
FIGURE 14 is a longitudinal sectional view of a cooling channel and a device for producing a twisting current by means of which the bundle of strands or fibers is twisted to a rope or a thread, both of the invention.
Figure 15:
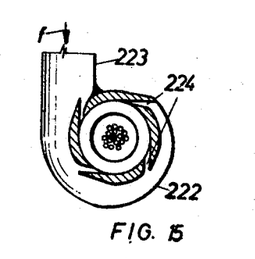
FIGURE 15 is a cross section along line A–B of FIGURE 14.

The strands or fibers 133 withdrawn from a discharge device along channel 106 (FIGURES 14 and 15) are combined to form a rope or thread 221 by means of a twisting current obtained by the tangential introduction of a gaseous or liquid medium. The device employed in this connection consists of a housing 222 wherein the above-mentioned medium is supplied through the feed pipe 223 (direction of arrow $f$) and then distributed upon several slot-shaped nozzles 224 terminating tangentially in the channel. In corespondence with the entrance velocity of the medium, the stream of cooling and suction media in the channel is forced into a helical path of a larger or smaller pitch, about the channel axis, this modified stream twisting the strands of fibers by its drag action.

Figure 16:
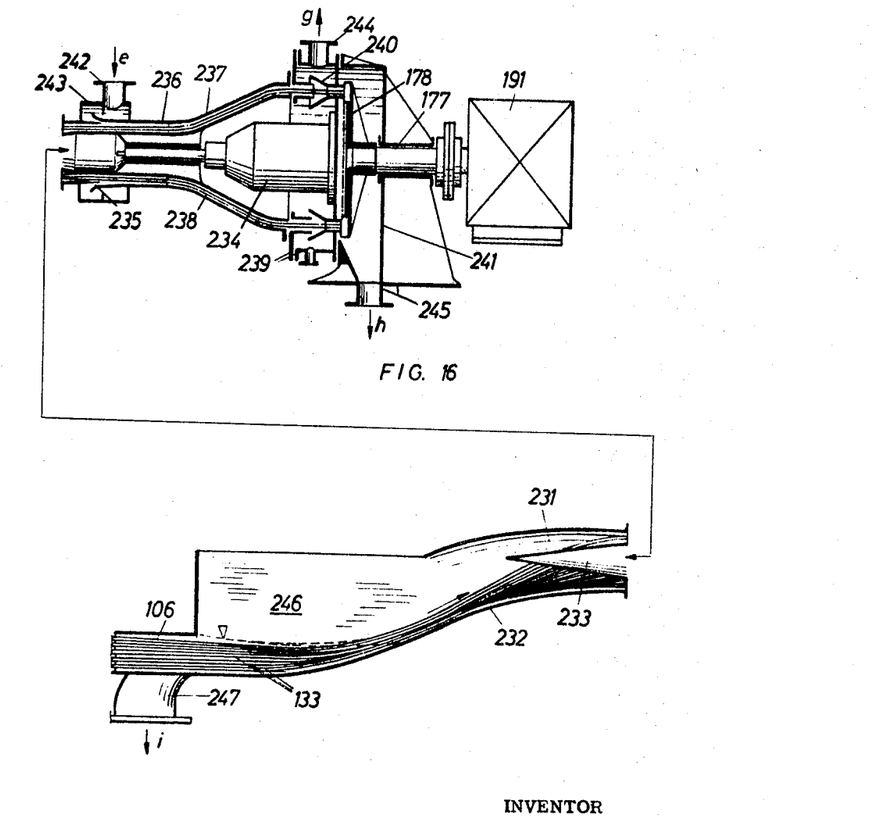
FIGURE 16 is a longitudinal sectional view of a device of the invention for conveying and simultaneously distributing a bundle of strands to a cutting device.

A device for conveying and distributing the bundle of melt strands withdrawn from a discharge device according to FIGURE 6 or 9 to a cutting device comprises, as shown in FIGURE 16, an annular inlet nozzle 231 delimited on the outside by a nozzle casing 232 and on the inside by a core 233. This core, which is rotatable about the axis of the nozzle and displaceable along the nozzle axis, tapers in a point toward the entrance direction of the strands 133 and can be set into rapid rotational and axial vibrations by an electromagnetically operating oscillator 234. The mouth of the inlet nozzle is encompassed by an annular nozzle 235 through which a gaseous conveying medium, for example air, is introduced. Thereafter, an annular channel 236 is provided which is limited on the inside by the core and on the outside by the housing wall 237. In the cone-shaped portion of the annular channel, there are guide ribs 238 tapering toward the conveying direction, which leave a channel free for each individual strand, this channel terminating in the ventilator housing 239. Inlet funnels 240 are in communication with these channels and conduct the strands to the cutter head 178 whose shaft 177 is supported in the housing 241 and driven by the engine 191. The conveying medium is fed to the annular nozzle housing 243 through feed pipe 242 (direction of arrow $e$). This medium is discharged, together with the air sucked in through the inlet nozzle, from the annular channel into the ventilator housing from which both are withdrawn through feed pipe 244 (direction of arrow $g$). For the discharge of the granulated material (direction of arrow $h$), the pipe 245 is arranged at the housing 241. When the withdrawing device commences operation, the strands are conveyed, together with the cooling and suction media, from the channel 106 into the trough 246. The higher-positioned inlet nozzle 231 receives the strands, and the oscillating core 233 distributes them over the cross section of the annular channel 236. The further transporting of the strands to the cutting device is effected by the conveying means. The liquid cooling and suction media leave the trough through pipe 247 (direction of arrow $i$).

The annular nozzle 236 of FIGURE 16 can be omitted if the housing 239 and, if desired, also the housing 241, are put under a vacuum, so that the entire amount of air used for conveying purposes is sucked in from these housings through the inlet nozzle 231 and through the annular channel 236. The arrangement can also be provided in such a manner that the granulated material is withdrawn pneumaticaly via a conduit joining the pipe 245 and is separated from the conveying air in cyclone separator. In such a case, a blower at the exit of the cyclone separator provides the required vacuum pressure in the entire system.

Figure 17:
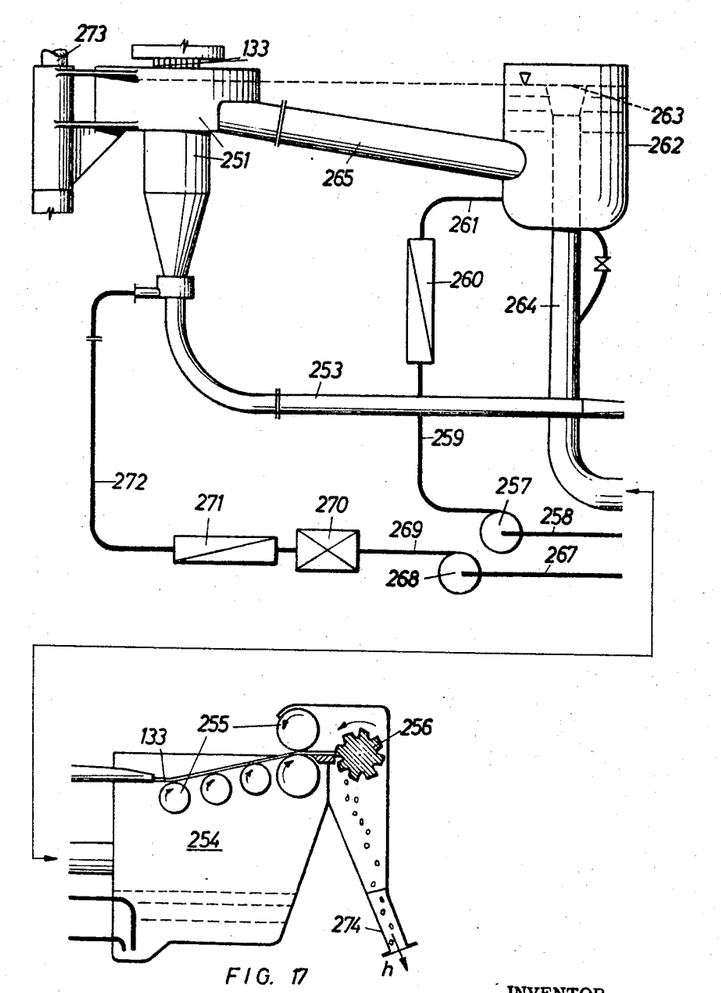
FIGURE 17 shows an entire embodiment of the invention.

A device for the withdrawal of melts and the production of granules as shown in FIGURE 17 consists essentially of withdrawing apparatus 251, cooling channel 253, collecting vessel 254 for the cooling and suction media, conveying device 255 for the melt strands, and the cutting device 256. The cooling and suction media are conducted in a cycle. For this purpose, a pump 257 is provided for the liquid cooling media. This pump withdraws the cooling medium through conduit 258 from the collecting vessel and conveys the medium via conduit 259, cooler 260, and conduit 261 into the leveling vessel 262 whose liquid level is maintained constant by means of the overflow 263. The excess cooling medium conveyed through the pump 257 flows back into the collecting vessel via the conduit 264. The leveling vessel is connected with the withdrawing apparatus through conduit 265. The suction medium is likewise withdrawn from the collecting container through conduit 267 and pump 268 and fed to the annular nozzle housing of the withdrawing device via conduit 269, filter 270, cooler 271, and conduit 272.

In the embodiment of FIGURE 17, the withdrawing apparatus 251 is pivotable about the column 273, so that, if necessary, for example when the apparatus has ceased operation, the discharge openings for the melt can be rendered accessible. This withdrawing device is arranged, for example according to FIGURE 9, for the discharge of a large number of melt strands 133. The transport of the cooled melt strands 133 to the cutting device is accomplished, in this case, by rotating rollers 255 provided above the collecting vessel 254. The cooling and suction means are directly discharged into this vessel. The cutting of the strands is accomplished by a cutter block 256 of conventional construction. The granulated material is discharged through pipes 274 (direction of arrow $h$).

In the embodiments, the simplest form of the suction medium nozzle with a non-variable nozzle ring slot was illustrated. However, in many cases, it will be preferable to select embodiments of annular nozzles whose annular slot can be varied in order to control the exit velocity and/or the quantity of the suction medium (cf. FIGURE 2).

Figures 18, 20:
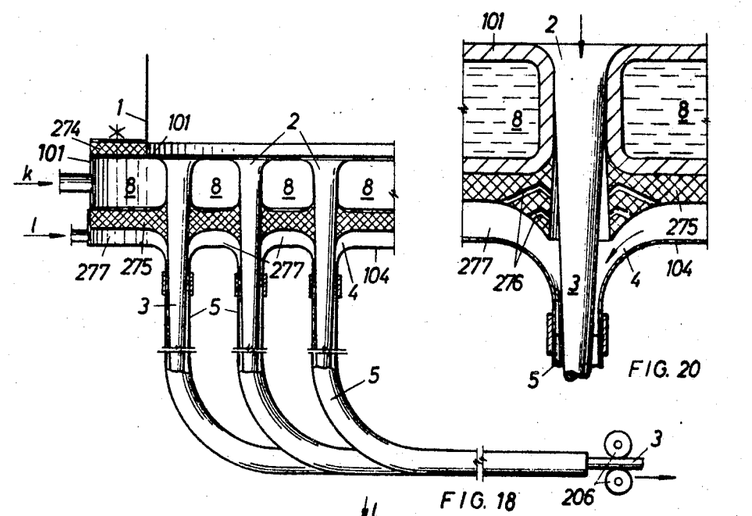
FIGURE 18 is a cross sectional view along line E–F of FIGURE 19 of a particularly efficient device of the invention for the discharge of polyamides and synthetic materials.
FIGURE 20 is an enlarged view taken from FIGURE 18 of only one discharge nozzle.
Figure 19:
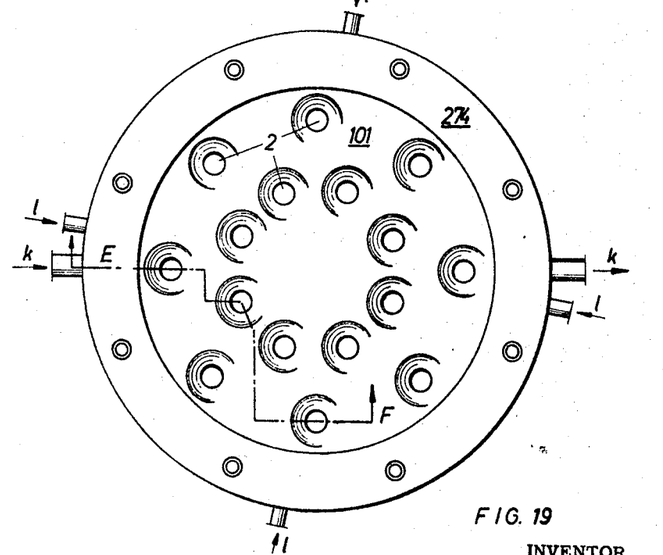
FIGURE 19 is a top view of the device of FIGURE 18.

FIGURES 18, 19 and 20 illustrate a particularly efficient device which is well suited also for the withdrawal of polyamides and synthetic materials with similar physical properties. A melting device 95 is combined with a bottom plate 101 having a preferably circular configuration and containing a large number of ducts 2 for the withdrawal of the melt. The bottom plate 101, provided with heating or cooling channels 8, has at least one inlet and outlet $k$ for a heating or cooling medium in the liquid phase, for the precise adjustment of the exit temperature of the melt. The bottom plate 101 is fixedly connected with the melting vessel 1 via a heat-insulating gasket 274, for example by means of a threaded connection, and is provided on its entire bottom surface except at the ducts 2 with a layer of heat-insulating material 275. Below, at a variable distance from the bottom plate, there is a plate 104 of sheet metal or another equivalent material which corresponds with respect to its surface configuration and outline to the underside of the bottom plate 101, so that, coaxially to each individual duct 2 of the bottom plate, an annular nozzle 4 is formed which constitutes a component of this plate 104 and is, so to speak, formed from this plate. A tube 5 joins each nozzle 4, for receiving respectively one melt strand together with the cooling or suction medium, the latter being, in this device, preferably an inert gas which is forced, under the required pressure, through several feed pipes 1 from the outside radially into the intermediate space 277 between the layer 275 and the sheet metal plate 104. The cold gas flows through the interspace 277 into the individual annular nozzles 4 and effects, by the cooling and suction activity in the direction of tubes 5, the discharge, stretching, and hardening of the melt strands 3 which are laterally conducted toward the outside at a comparatively short distance from the bottom plate 101 through an angle of 90°. They exit from the tubes 5, and are further conducted via rollers 206 for example to a cutting device. A smaller portion of the cold gas stream is blown from the interspace 277 through narrow channels 276 in the heat-stopping layer 275 onto the melt strands in order to initiate the solidification thereof.

Such a device ensures a good coordination between the exiting melt and the suction effect of the cooling medium. This device can also perform without the utilization of water. This is an important advantage for the treatment of polyamides, for example. Furthermore, the distance between the heat-stopping layer 275 and the sheet metal plate 104 can be adjusted, if necessary, by suitable conventional means, whereby a further convenient controlling possibility is obtained for the total cross section of the gas flow and thus for the amount and the velocity of the gas. This adjustment possibility is not illustrated in the drawings.

EXAMPLE

Two tons of a melt consisting of the polycondensate nylon 66 produced in a reactor are withdrawn in a short period of time and worked directly into a granulated material of cylindrically shaped granules (diameter: 3 mm.; length: 3 mm.).

At the bottom of the reactor, 40 discharge openings are provided, having an inside diameter of 8 mm., in accordance with FIGURE 5 in a uniform distribution along a circle of 400 mm. diameter. From these openings, the viscous melt (viscosity about 1,800–2,000 poises) exits with a temperature of 270° C. into the cooling medium whose narrowest diameter is 9 mm. The cooling medium is water which is fed to the trough at a temperature of about 30° C. In the trough, the water is distributed over the circle of nozzles. The suction medium is likewise water which is fed to the annular nozzles at a pressure of about 4 atmospheres gauge pressure and a temperature of 30° C. and exits therefrom at a rate of about 25 m./sec. Each minute, a total of about 330 liters of suction medium convey the melt strands with 1,000 liters of cooling medium into the channels, having a length of about 4 m. The strands are stretched during this procedure to more than seven times their length and are then withdrawn together with the cooling and suction media in these channels. The strands now have a diameter of 3 mm. and are divided, after the cooling and suction media have been removed, in the cutting device to granules of a length of 3 mm. The cutter block with 42 blades has a speed of revolution of 3,400 r.p.m.

The cooling and suction media separated from the melt product have warmed to about 43° C. and are recycled into the withdrawing device after the absorbed heat has been removed therefrom in a cooler.

The melt from the reactor is withdrawn and processed into granulated material within a time period of less than 15 minutes. In this short period of time, the molecular weight of the melt product varies hardly at all, so that the entire granulated material is of practically identical quality.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claim.

I claim:

1. An apparatus for solidifying liquid, solidifiable, thermoplastic material into strands, comprising: a liquid-holding vessel; a discharge duct (2) extending between an orifice (9) at the bottom interior of said vessel and an orifice (10) at the outside of said vessel; said discharge duct imparting a predetermined initial flow direction to material issuing from its outside orifice; a cooling nozzle means (4, 11) to flow cooling fluid in encompassment of material issuing from said outside orifice immediately upon the issuance thereof; said cooling nozzle means surrounding said outside orifice and imparting to fluid flowing therethrough a resultant vector flow direction equal to that given material issuing from said outside orifice; said cooling nozzle means having an inner surface coaxially surrounding the axis of said initial flow direction and converging toward a cooling fluid discharge end; said vessel having a conical external surface converging toward said outside orifice; said cooling nozzle means including a ring having a conical internal surface converging in the direction of strand flow; said ring mounted with its internal surface coaxial with the external surface of said discharge duct, thereby creating a fluid flow gap between ring and vessel duct; further comprising means to bias said ring and its internal surface toward contact with the external surface of said discharge duct.

References Cited

UNITED STATES PATENTS

| | | | |
|---|---|---|---|
| 1,156,079 | 10/1915 | Holley | 264—12 |
| 1,351,865 | 9/1920 | Nicol | 264—12 |
| 2,411,660 | 11/1946 | Manning. | |
| 2,699,631 | 1/1955 | Stalego | 65—7 |
| 2,773,282 | 12/1956 | Backer | 264—12 X |
| 2,980,628 | 4/1961 | Smith | 18—2.7 X |
| 3,028,623 | 4/1962 | Labino | 65—16 |
| 3,032,456 | 5/1962 | Wade | 264—12 X |
| 3,045,278 | 7/1962 | Potter | 65—16 X |

WILLIAM J. STEPHENSON, *Primary Examiner.*